(No Model.)
C. NAGLEY.
SHEARS FOR CUTTING TOBACCO PLANTS.
No. 298,768. Patented May 20, 1884.
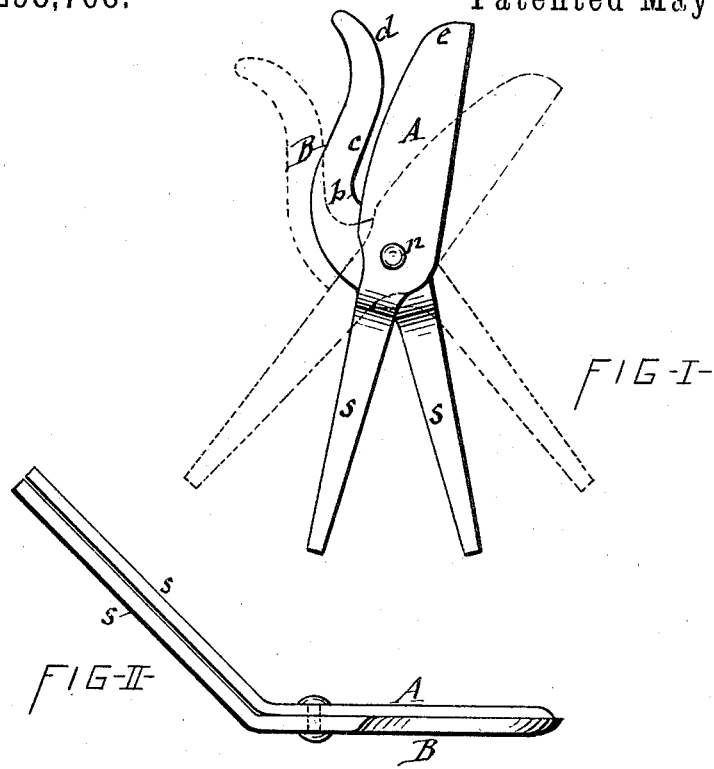
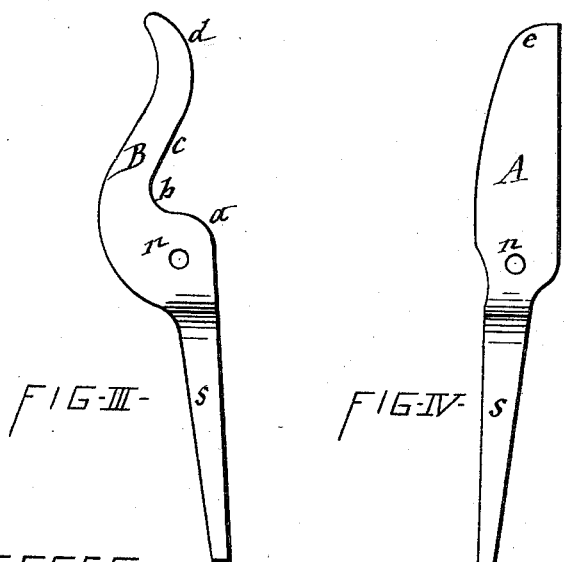
WITNESSES:
C. Bendixon
Wm C. Raymond
INVENTOR:
Charles Nagley
per Duell, Laass & Hey
his Atty

UNITED STATES PATENT OFFICE.

CHARLES NAGLEY, OF MEMPHIS, NEW YORK.

SHEARS FOR CUTTING TOBACCO-PLANTS.

SPECIFICATION forming part of Letters Patent No. 298,768, dated May 20, 1884.

Application filed March 1, 1884. (No model.)

*To all whom it may concern:*

Be it known that I, CHARLES NAGLEY, of Memphis, in the county of Onondaga, in the State of New York, have invented new and useful Improvements in Tobacco-Plant Cutters, of which the following, taken in connection with the accompanying drawings, is a full, clear, and exact description.

This invention consists in a novel construction of two shearing-blades pivoted to each other and having cutting-edges of a peculiar contour which serve to guide the implement in its approach to the plant to be cut, and in closing in on said plant obtain an effective hold thereon and allow the blades to perform the cutting chiefly with the portions of the blades near the pivot thereof, thus obtaining greater power for cutting the plant with less strain on the blades of the implement.

The invention is fully illustrated in the annexed drawings, wherein Figure I is a plan view of my improved tobacco-plant cutter, showing it in an open and closed position. Fig. II is an edge view of the same, and Figs. III and IV are detached plan views of the blades of the cutter.

Similar letters of reference indicate corresponding parts.

A and B represent the two blades of which the tobacco-plant cutter is composed, said blades being pivoted to each other, as shown at $n$, and having the shanks $s$ $s$ bent from a point a short distance back of the pivot upward from the plane of the blades to carry in an inclined position the handles which are attached to said shanks, thus allowing the operator to stand upright in the operation of cutting the plants. The blade A has its cutting-edge curved slightly toward the back from near the pivot $n$ to near the end of the blade and terminating with increased curvature, as shown at $e$. The blade B has a reversed curved cutting-edge beginning with an abrupt rearward or outward curve, $a$, near the pivot $n$, continuing with an abrupt reverse curve, $b$, thence a tangential portion, $c$, and terminating with an extensive rearward or outward curve, $d$, as shown. The ends of the said blades present jointly two flaring cutting-edges which serve to guide the implement in its application to the plant to be cut, then by opening or spreading apart the two blades they can be carried forward to bring the stalk of the plant up to the abruptly-reversed curved portion $b$, and hence near the pivot of the blades. Then upon closing the blades they obtain such a hold on the stalk of the plant as to prevent the implement from slipping rearward, thus relieving the operator of the labor of applying continuous forward pressure to the implement and obtaining the maximum power for cutting with the minimum strain.

Having described my invention, what I claim as new is—

The improved tobacco-plant cutter, consisting of the blade A, having its cutting-edge curved slightly toward the back from near the pivot to near the end of the blade, and terminating with increased curvature, and the blade B, pivoted to blade A, and having a reversed curved cutting-edge beginning with an abruptly rearward curve, $a$, near the pivot of the blade, continuing with the abrupt reverse curve $b$, thence a tangential portion, $c$, and terminating with the extensive rearward or outward curve $d$, said blades having shanks $s$ $s$ bent upward from the plane of the blades, the whole constructed substantially as shown and set forth.

In testimony whereof I have hereunto signed my name and affixed my seal, in the presence of two attesting witnesses, at Syracuse, in the county of Onondaga, in the State of New York, this 14th day of February, 1884.

CHARLES NAGLEY. [L. S.]

Witnesses:
    FREDERICK H. GIBBS,
    C. H. DUELL.